(12) United States Patent
Lasken et al.

(10) Patent No.: US 7,155,433 B2
(45) Date of Patent: Dec. 26, 2006

(54) MAPPING OF CLIENT APPLICATION VARIABLE TO DATABASE STORAGE LOCATION FREE OF ALLOCATION TO ANY PARTICULAR VARIABLE

(75) Inventors: Richard Dale Lasken, Naperville, IL (US); Pranil Pradeep Vaidya, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 416 days.

(21) Appl. No.: 10/179,427

(22) Filed: Jun. 25, 2002

(65) Prior Publication Data

US 2004/0003012 A1 Jan. 1, 2004

(51) Int. Cl.
*G06F 17/30* (2006.01)

(52) U.S. Cl. .......................................... 707/6; 707/203

(58) Field of Classification Search ............. 707/1–10, 707/100–104.1, 200–205; 379/112.04, 221.07
See application file for complete search history.

(56) References Cited

U.S. PATENT DOCUMENTS

| | | | | |
|---|---|---|---|---|
| 4,974,256 A | * | 11/1990 | Cyr et al. ............... | 379/112.04 |
| 5,452,350 A | * | 9/1995 | Reynolds et al. ...... | 379/221.07 |
| 5,991,776 A | * | 11/1999 | Bennett et al. ......... | 707/205 |
| 6,751,626 B1 | * | 6/2004 | Brown et al. ........... | 707/101 |

* cited by examiner

*Primary Examiner*—Mohammad Ali (57) ABSTRACT

An apparatus in one example comprises a management component that handles information storage to one or more storage locations of a database. The one or more storage locations comprise one or more available locations that are free of allocation to any particular variable. The management component maps one or more variables of one or more client applications to respective one or more selected locations of the one or more available locations.

22 Claims, 5 Drawing Sheets

| | ACCOUNT # (INTEGER) 304 | NAME OF ACCOUNT HOLDER (STRING) 306 | INTEGER1 234 | INTEGER2 236 | DOUBLE1 238 | DOUBLE2 240 | STRING1 242 |
|---|---|---|---|---|---|---|---|
| RECORD 1 — 202 | | | INTEGER1 | INTEGER2 | DOUBLE1 | DOUBLE2 | STRING1 |
| RECORD 2 — 204 | | | INTEGER1 | INTEGER2 | DOUBLE1 | DOUBLE2 | STRING1 |
| RECORD 3 — 206 | | | INTEGER1 | INTEGER2 | DOUBLE1 | DOUBLE2 | STRING1 |
| RECORD 4 — 208 | | | INTEGER1 | INTEGER2 | DOUBLE1 | DOUBLE2 | STRING1 |
| RECORD 5 — 210 | | | INTEGER1 | INTEGER2 | DOUBLE1 | DOUBLE2 | STRING1 |
| RECORD 6 — 212 | | | INTEGER1 | INTEGER2 | DOUBLE1 | DOUBLE2 | STRING1 |
| RECORD 7 — 214 | | | | ... | | | |

MAPPING OF CLIENT APPLICATION VARIABLE TO DATABASE STORAGE LOCATION FREE OF ALLOCATION TO ANY PARTICULAR VARIABLE

TECHNICAL FIELD

The invention relates generally to information management and more particularly to handling of variables for client applications.

BACKGROUND

A database, in one system, is created with a fixed number of storage locations. The storage locations are pre-defined to store specific variables of a particular client application. The specific variables employed by the particular client application may be different from variables that are employed by another client application.

As one shortcoming of such a system, separate databases must be designed whenever the specific variables of each client application differ. The pre-defined storage locations in the database limit the number of different client applications that will be able to use the database. If a first client application needs storage for three specific variables in each record of the database, then all the records of the database must be designed with three data fields set to store only the three specific variables. If a second client application needs storage for variables that in any way differ from the specific variables of the first client application, then the version of the database designed for the first client application cannot be used by the second client application. So, the pre-defined storage locations of the database undesirably create a likelihood that the database will be incompatible with different client applications.

As another shortcoming of the system, the fixed number of storage locations pre-defined for each record undesirably restrict a client application from employing any greater number of variables with each record in the database. If the client application undergoes an update and requires an additional storage location in the database to accommodate a new variable, then a corresponding update of the database is required.

As a further shortcoming of the system, the fixed number of storage locations pre-defined for each record in the database represents an inefficient use of the database. Not every client application uses all the storage locations allocated for each record. The unused yet specifically allocated storage locations of one record cannot be used for any other records. In addition, the predefinition of storage locations results in an undesirably low limit on the total number of records that can exist in the database.

Thus, a need exists for enhanced database storage of variables from client applications. A need also exists for enhanced accessibility to such variables. A further need exists for enhanced accommodation of changing needs of client applications with respect to variables.

SUMMARY

The invention in one embodiment encompasses an apparatus. The apparatus includes a management component that handles information storage to one or more storage locations of a database. The one or more storage locations comprise one or more available locations that are free of allocation to any particular variable. The management component maps one or more variables of one or more client applications to respective one or more selected locations of the one or more available locations.

Another embodiment of the invention encompasses a method. One or more client applications are accommodated through storage of one or more variables, of the one or more client applications, in a database that is without any specific expectation of the one or more variables.

A further embodiment of the invention encompasses an article. The article includes a computer-readable signal-bearing medium. The article includes means in the medium for accommodating one or more client applications through storage of one or more variables, of the one or more client applications, in a database that is without any specific expectation of the one or more variables.

DESCRIPTION OF THE DRAWINGS

Features of exemplary implementations of the invention will become apparent from the description, the claims, and the accompanying drawing in which:

FIG. 4 is a representation of yet another exemplary implementation of the database of the apparatus of FIG. 1, illustrating the database with one or more pre-allocated storage locations and one or more available storage locations, and further illustrating the pre-allocated storage locations and the available storage locations associated with one or more records of the database.

DETAILED DESCRIPTION

Figure 1:
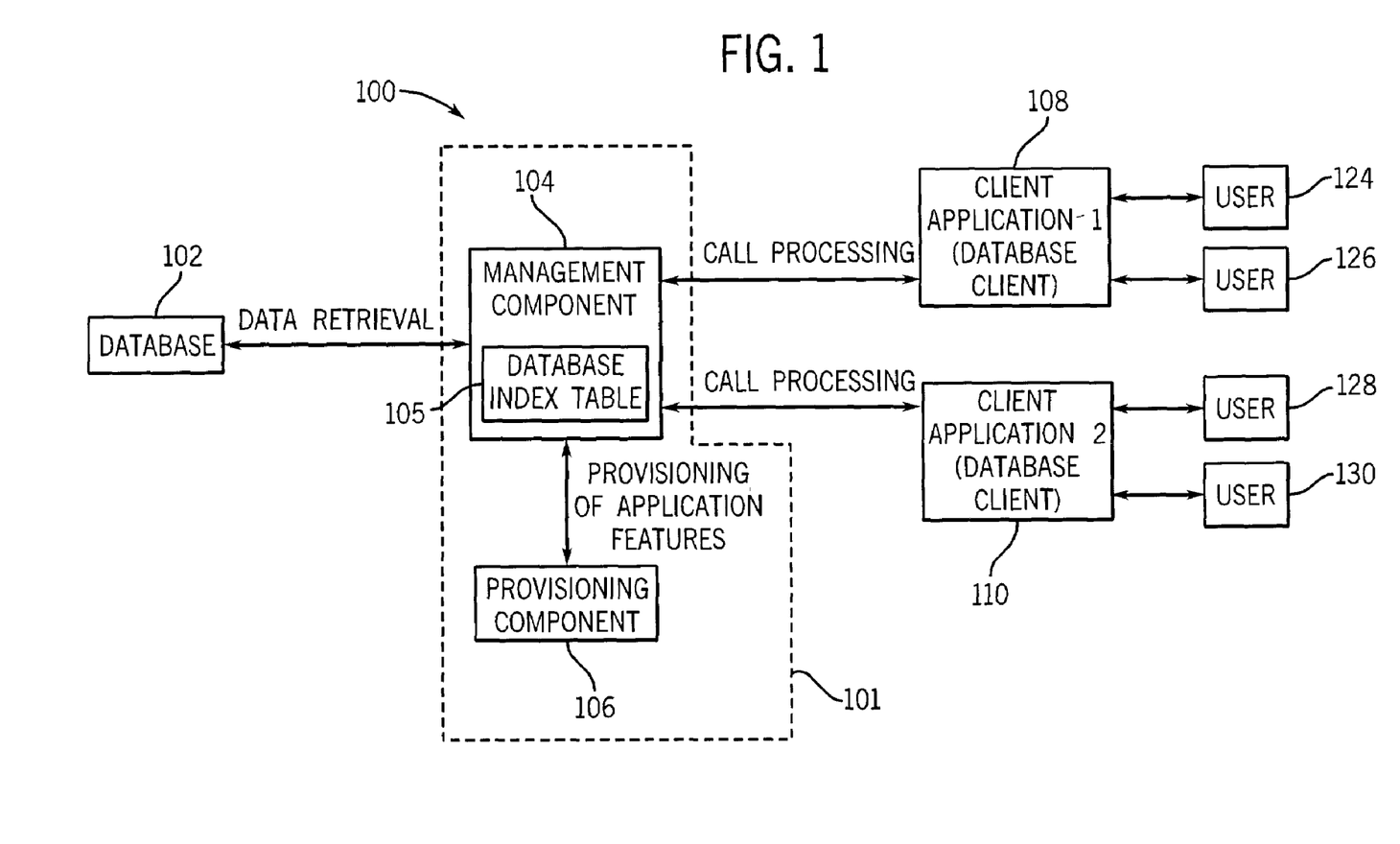
FIG. 1 is a representation of one exemplary implementation of an apparatus that comprises one or more databases, one or more management components, one or more provisioning components, and one or more client applications.

Turning to FIG. 1, an apparatus 100 in one example comprises a management component that handles information storage to one or more storage locations of a database. The one or more storage locations comprise one or more available locations that are free of allocation to any particular variable. The management component maps one or more variables of one or more client applications to respective one or more selected locations of the one or more available locations. The apparatus 100 includes a plurality of components such as computer software and/or hardware components. A number of such components can be combined or divided in the apparatus 100.

The apparatus 100 in one example employs at least one computer-readable signal-bearing medium. One example of a computer-readable signal-bearing medium for the apparatus 100 comprises an instance of a recordable data storage medium 101 such as one or more of a magnetic, electrical, optical, biological, and atomic data storage medium. In another example, a computer-readable signal-bearing medium for the apparatus 100 comprises a modulated carrier signal transmitted over a network comprising or coupled with the apparatus 100, for instance, one or more of a telephone network, a local area network ("LAN"), the internet, and a wireless network. An exemplary component of the apparatus 100 employs and/or comprises a set and/or series of computer instructions written in or implemented with any of a number of programming languages, as will be appreciated by those skilled in the art.

In one example, the apparatus 100 serves as a database management system. In a further example, the apparatus 100 serves as a telecommunications subscriber database management system. The apparatus 100 comprises one or more databases 102, one or more management components 104, one or more provisioning components 106, and one or more client applications 108 and/or 110. The database 102 in one example is located in a storage device. The recordable data storage medium 101 and the database 102 in one example are located in a same storage medium. In another example, the recordable data storage medium 101 and the database 102 are located in different storage media. In a further example, the database 102 comprises a plurality of databases. One or more of users 124, 126, 128, and 130 interact with the client applications 108 and/or 110. The users 124, 126, 128, and 130 comprise one or more of human operators, hardware entities, and software entities.

The management component 104 serves as an interface between the database 102 and the client applications 108 and 110. The management component 104 comprises a primary channel for data flow through the apparatus 100. The management component 104 creates a one-to-one mapping of a variable of the client application 108 to a storage location of the database 102 that is free of allocation to any particular variable and comprises a capacity corresponding to a data type of the variable.

Figure 2:
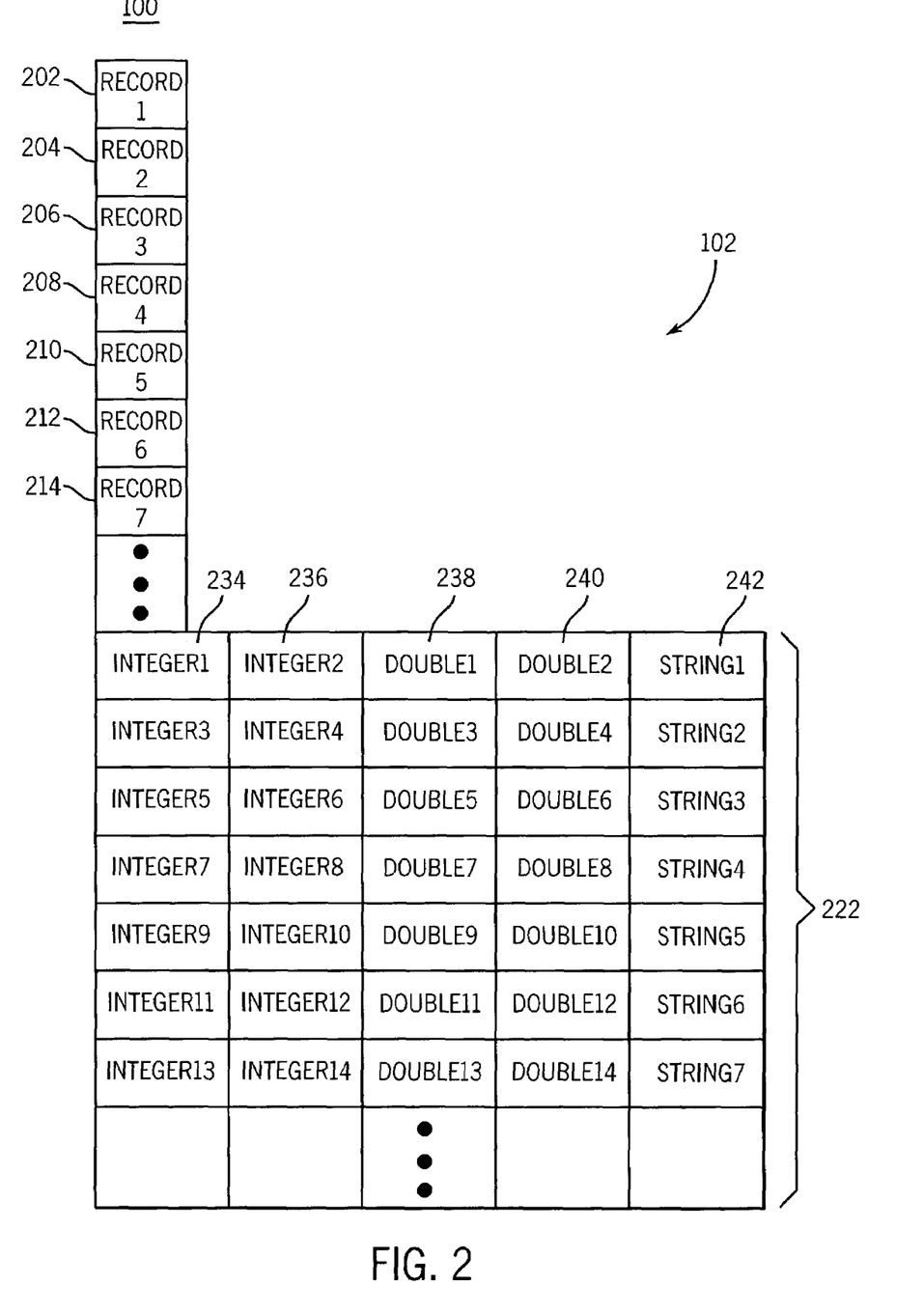
FIG. 2 is a representation of one exemplary implementation of the database of the apparatus of FIG. 1, illustrating the database with a plurality of available storage locations.
Figure 3:
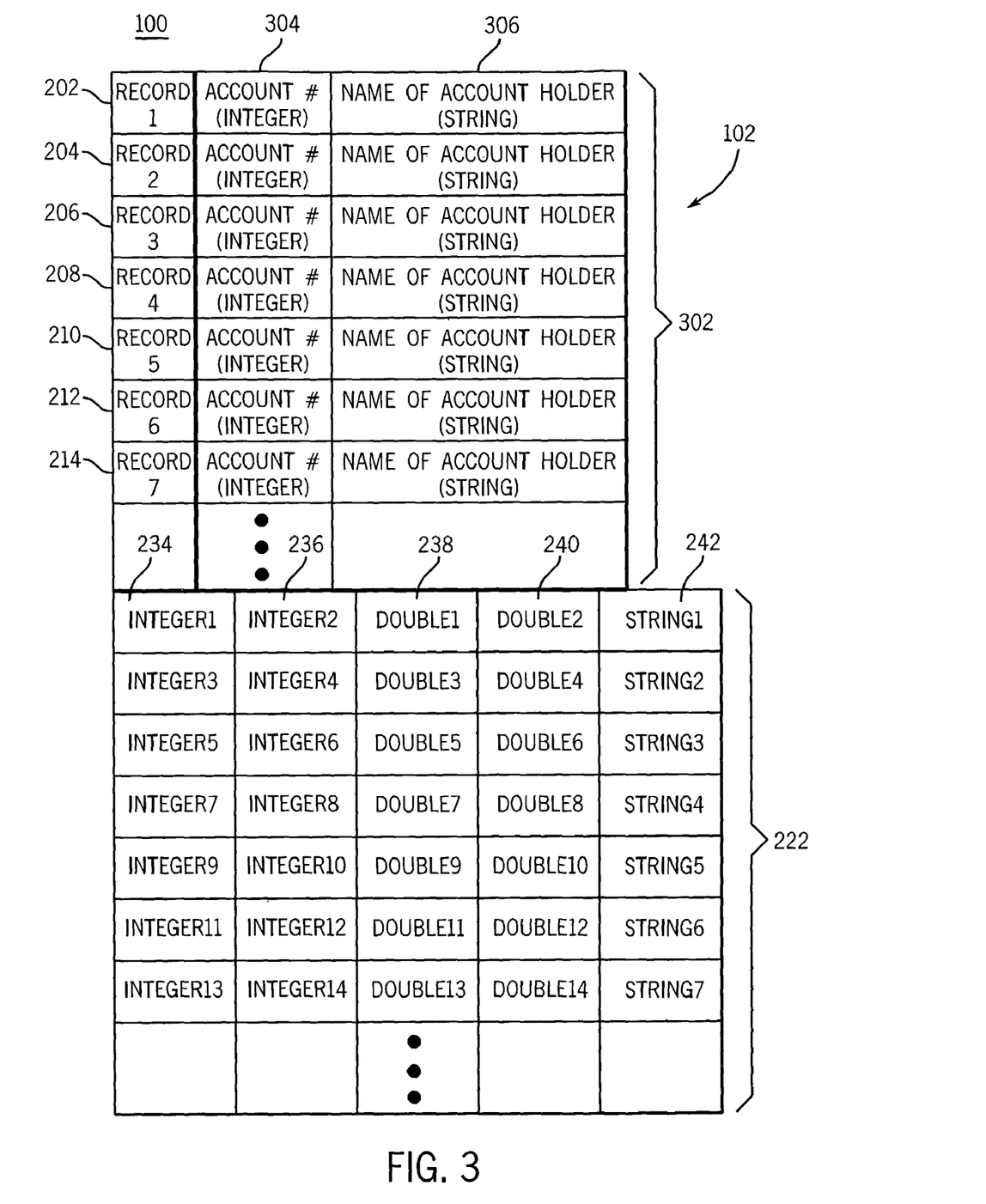
FIG. 3 is a representation of another exemplary implementation of the database of the apparatus of FIG. 1, illustrating the database with a plurality of pre-allocated storage locations and a plurality of available storage locations, and further illustrating the pre-allocated storage locations associated with one or more records of the database.

Now referring to FIGS. 1–3, the database 102 comprises storage portions 222 and/or 302. The storage portions 222 and 302 comprise one or more storage locations. Exemplary storage locations of the database 102 comprise storage locations 234, 236, 238, 240, 242, 304, and 306. The storage portion 222 comprises one or more storage locations for which the database 102 is without any expectation of the particular variables of the client applications 108 and/or 110 to be stored therein. The storage locations, of the storage portion 222, are initially free of allocation to any particular variable. The storage portion 302 comprises one or more storage locations pre-allocated in the database 102 to store specific variables of the client applications 108 and/or 110. Further below is presented an illustrative description of first, second, and third exemplary implementations of the database 102 with reference to FIG. 1 in conjunction with FIGS. 2, 3, and 4, respectively.

Referring to FIGS. 1–2, the database 102 comprises one or more records. The records comprise a changeable number of storage locations. The number of the storage locations in a record changes with the needs of the client application 108. Exemplary records of the database 102 comprise records 202, 204, 206, 208, 210, 212, and 214, as described herein. One or more of the records of the database 102 are associated with one or more of the client applications 108 and/or 110. For example, the record 202 stores the variables used by the client application 108.

The provisioning component 106 performs a selection of storage locations from the storage portion 222 based on the storage needs of the client applications 108 and/or 110. When the client application 108 needs one or more of the storage locations of the storage portion 222 for storage of a variable, the provisioning component 106 performs the selection to coordinate the data type of the variable with the capacity of a storage location of the storage portion 222. The provisioning component 106 passes the result of the selection to the management component 104. Additional illustrative discussion of exemplary operation of the management component 104 and the provisioning component 106 is presented herein, for explanatory purposes.

Referring to FIG. 2, the storage locations of the storage portion 222 are designed to store variables of any name. Initially, the storage locations of the storage portion 222 are available to store any variable. The available storage locations of the storage portion 222 are free of allocation to any particular variable. Based on the needs of the client applications 108 and/or 110, the management component 104 soft allocates available storage locations of the storage portion 222 to store variables of the client applications 108 and/or 110, as described herein.

In one example, the soft allocation is temporary. At one point in time, the management component 104 allocates a certain storage location of the storage portion 222 to store a first variable. At a subsequent point in time, the management component 104 frees the certain storage location from allocation to store the first variable. For example, the client application 108 no longer has a need for the first variable. Thereafter, the management component 104 can allocate the certain storage location to store a second variable.

The management component 104 receives requests from the client application 108 to store variables in the database 102. The management component 104 accommodates the client application 108 upon presentation of a variable for which none of the storage locations of the storage portion 302 have been pre-allocated to store the variable. For example, the management component 104 employs one of the storage locations of the storage portion 222 to store the variable.

Referring to FIGS. 1–2, the management component 104 serves as an interface for the client application 108 to store the variable in the database 102. From the perspective of the database 102, the management component 104 serves to translate the name of a variable employed by the client application 108 to a reference name employed by the database 102 for a storage location of the storage portion 222 selected to store the variable, as described herein. From the perspective of the client application 108, the management component 104 serves to translate the reference name of the selected storage location of the storage portion 222, employed by the database 102, to the name of the variable employed by the client application 108. Furthermore, neither the client application 108 nor the database 102 needs to know the details of the name translation. The client application 108 and the database 102 trust the management component 104 to map the variable to the storage location.

The provisioning component 106 serves to select the storage location 234 to store the variable based on one or more characteristics of the variable, for example, one or more of type, size, and length of the variable. For example, the provisioning component 106 performs the selection by matching a data type of the variable to a corresponding capacity of the storage location 234. In one example, the data type of the variable comprises an integer, and storage location 234 comprises a corresponding capacity to store an integer. The provisioning component 106 reviews the available storage locations of the storage portion 222 to select the storage location 234. Next, the provisioning component 106 communicates the selection of the storage location 234 to the management component 104, to accommodate the variable. The management component 104 employs the selection by the provisioning component 106 to map the variable to the storage location 234. The storage location 234 in one example is associated with the record 202 when the storage location is allocated to the variable. In one example, an account of the client application 108 is associated with the record 202. In a further example, the management component 104 associates the storage location 234 with the record 202 upon introduction of the variable to the management component 104 as associated with the account already associated with the record 202.

Referring to FIG. 3, the storage portion 302 comprises one or more storage locations pre-allocated to store specific variables. The database designer decides which variables to accommodate in the storage portion 302 based on the variables with a name common to the client applications 108 and 110. The storage locations of the storage portion 302 are reserved for one or more expected variables of the client applications 108 and/or 110. For example, a designer of the database 102 designates the storage locations of the storage portion 302 to store predetermined variables of the client applications 108 and 110. The database designer defines the storage locations of the storage portion 302 to have specific names. The specific names of the storage locations of the storage portion 302 correspond to predetermined names of the expected variables. For example, the storage locations of the storage portion 302 are hard allocated to store the expected variables.

When the client application 108 presents an expected name to the management component 104, the management component 104 maps the predetermined variable to the pre-allocated storage location of the storage portion 302. In one example, the management component 108 performs one or more additional checks as part of the mapping. When the client application 108 introduces to the management component 104 a variable with a name other than the names expected for the storage locations of the storage portion 302, the management component 108 maps the variables to the storage locations of the storage portion 222, as described herein.

The record 202 in one example comprises one or more storage locations pre-allocated to store specific variables. The designer of the database 102 decides which variables to accommodate in an individual record based on the individual requirements of the client applications 108 and/or 110 for variables. A first record of the database 102 may have one or more storage locations pre-allocated to store variables with names different from names of variables stored in storage locations of a second record of the database 102. Should the client application 108 employ the record 202, the management component 104 allows the client application 108 to use any of the storage locations within the record 202.

In a first exemplary implementation of the database 102, referring to FIGS. 1–2, all the records of the database 102 are initially free of association with any particular variables of the client applications 108 and 110. The database 102 comprises the storage locations of the storage portion 222 ready for allocation to the records as directed by the management component 104 in accommodation of the client applications 108 and 110.

In a second exemplary implementation of the database 102, referring to FIGS. 1 and 3, the records of the database 102 comprises the storage locations of the storage portion 222 and the storage locations of the storage portion 302. The storage portion 222 is initially free of association with any record of the database 102. In addition, the storage portion 222 is without any expectation of the identities of the variables to be store in the storage portion 222. For example, the storage location 234 is ready to store any variable of the client application 108 and/or 110 of a data type corresponding to a capacity of the storage location 234, as directed by the management component 104. The storage portion 302 comprises storage locations that are pre-associated with particular records and pre-allocated to store specific variables of client applications 108 and/or 110.

In a third exemplary implementation of the database 102, referring to FIGS. 1 and 4, the records of the database 102 are pre-configured to comprise set storage locations of the storage portion 222 and the storage portion 302. A record of the database 102 comprises a preset number of storage locations pre-allocated to predetermined variables and a preset number of storage locations available for dynamic assignment to new variables.

The designer of the database 102 decides upon the capacity and number of storage locations of the storage portions 222 and/or 302 through analysis of expected needs of features to be supported by the client applications 108 and/or 110. The storage location 234 comprises a set size and/or capacity. The name of the storage location 234 is a reference index specific to the database 102. The client applications 108 in one example is unaware of the name of the storage location 234 in the database 102. Instead, the client application 108 trusts the management component 104 to handle mapping of a variable employed by the client application 108 to the storage location 234.

The storage locations of the storage portion 222 are designed to store one or more data types. In one example, the storage location 234 is pre-formatted to store an integer type. In another example, the storage location 234 is pre-formatted to store a string type. In yet another example, the storage location 234 is pre-formatted to store a double type.

Figure 5:
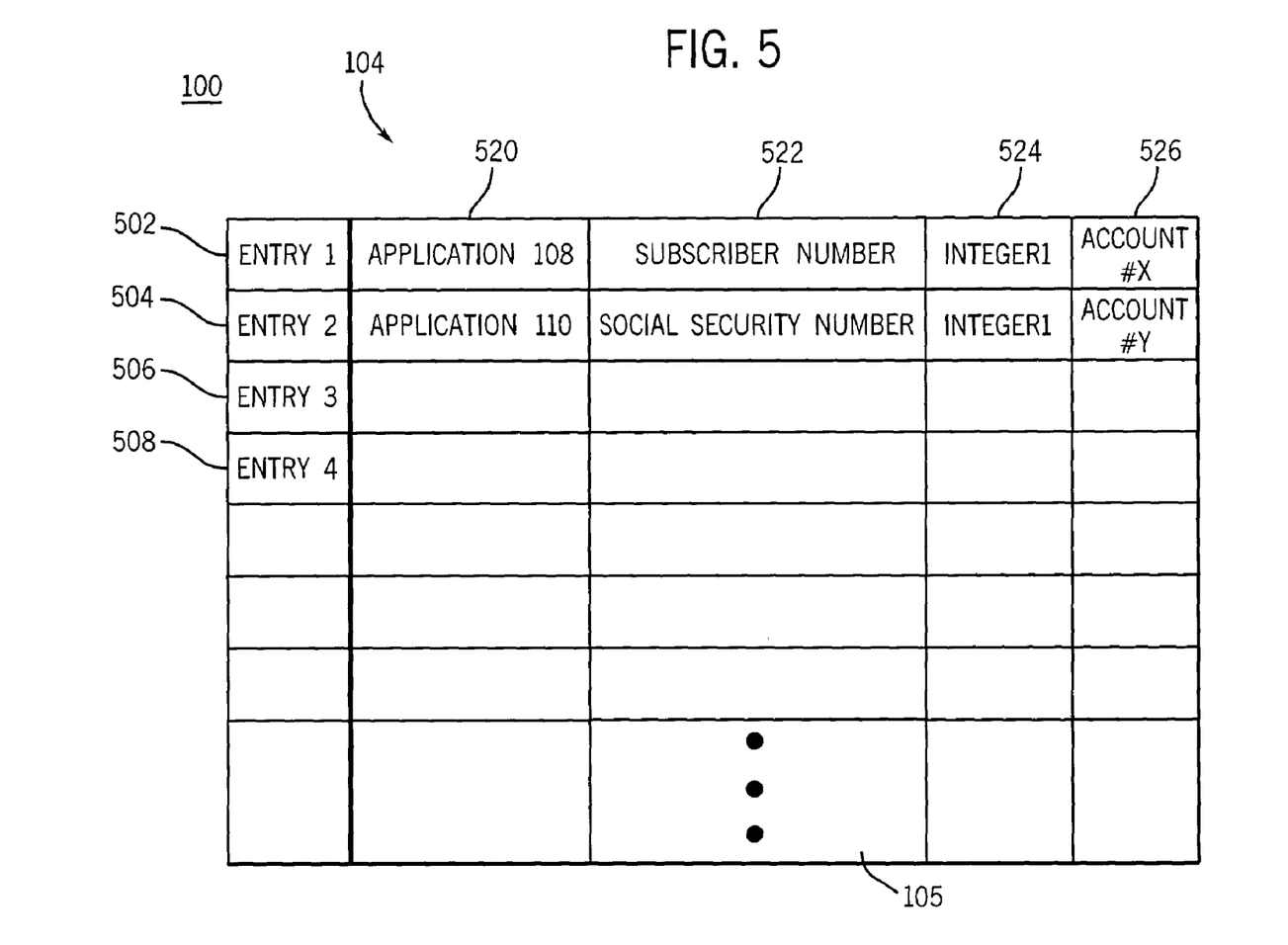
FIG. 5 is a representation of one exemplary implementation of a table employable by the management component and the provisioning component of the apparatus of FIG. 1.

The management component 104 employs a table 105. The management component 104 references the table 105 when processing and communicating requests from the client application 108 and/or 110 and replies from the database 102. The management component 104 in one example hides the mapping information of the table 105 from the database 102 and the client applications 108 and/or 110. The management component 104 stores a specific variable of the client application 108 in any available one of the storage locations of the storage portion 222 that comprise a capacity corresponding to the data type of the variable.

The client application 108 in one example is not concerned and/or aware that the database 102 does not have a pre-allocated storage location of the storage portion 222 for each of the variables of the client application 108. The client application 108 trusts the management component 104 to handle the storage of the variables of the client application 108. When a variable of the client application 108 is stored in a storage location of portion 222, the management component 104 makes the database 102 believe that the name of the variable employed by the client application 108 is the same as the reference name of the storage location of the storage portion 222 employed by the database 102.

Now referring to FIGS. 1 and 5, the table 105 keeps a list of all variable mappings made by the management component 104. For example, the table 105 comprises a database index table 105. The table comprises one or more entries, for example, entries 502, 504, 506, and 508. The number of entries of the table 105 at a particular time in one example equals the number of variables of the client applications 108 and/or 110 for which the management component 108 at the particular time maintains mapping to storage locations of the database 102.

The entry 502 indicates the location of a variable of the client application 108 in the database 102. The entry 502 comprises one or more of a client application index 520, a client application associated variable name 522, a database associated field name 524, and an account number index 526. The management component 104 references the table 105 when the client application 108 requests access to a variable stored in the database 102. In one example, the access to the variable involves an operation to be performed on the variable. Exemplary operations comprise one or more of modify, delete, and retrieve.

Referring to FIGS. 1, 2, and 5, now is presented an illustrative description of exemplary allocation of the storage location 234 to a variable of the client application 108. The client application 108 desires to store a variable in one of the available storage locations of the storage portion 222. The client application 108 sends a request to the management component 104. One example of the request is the client application 108 introducing a variable named SUBSCRIBER NUMBER to be used by the client application 108 in conjunction with the database 102. In addition, the request from the client application 108 to the management component 104 indicates that the variable SUBSCRIBER NUMBER is to be associated with ACCOUNT #X. The client application 108 needs a storage location of the integer type to store SUBSCRIBER NUMBER. The client application 108 sends the request to the management component 104.

The management component 104 makes a determination whether a storage location of the database 102 has been allocated for the variable SUBSCRIBER NUMBER. For example, the management component 104 employs the table 105 to determine if a storage location of the database 102 has been allocated to the variable SUBSCRIBER NUMBER. If there is not an entry in the table 105 for the variable SUBSCRIBER NUMBER, then the management component 104 allocates therefor a storage location from storage portion 222.

To determine the storage location from storage portion 222 for the variable SUBSCRIBER NUMBER, the management component 104 communicates with the provisioning component 106. The provisioning component 106 selects the storage location of the storage portion 222 by correlating the capacity of the storage location with the data type of the variable SUBSCRIBER NUMBER.

For ACCOUNT #X, the provisioning component 106 selects the storage location INTEGER1 of storage portion 222 to store the variable SUBSCRIBER NUMBER of the client application 108. For example, the database 102 knows the storage location INTEGER1 as the storage location 234. The management component 104 accommodates the variable SUBSCRIBER NUMBER by mapping the request of the client application 108 to the storage location 234. The management component 104 records the mapping of the variable SUBSCRIBER NUMBER in the entry 502 of the table 105. No update of the database 102 is needed even though the client application 108 has employed the storage location 234 of the storage portion 222 to store the variable SUBSCRIBER NUMBER.

Another example illustrates the client application 108 modifying the selected storage location 234, that was originally free of allocation to any particular variable, but has subsequently been allocated to a specific variable of the client application 108. When the client application 108 desires to modify the contents of the storage location 234 that has been allocated to a specific variable of the client application 108, the client application 108 sends a request to the management component 104. In one example, the client application requests access to the record of ACCOUNT #X. For example, the client application 108 request that the value of the variable SUBSCRIBER NUMBER be changed to store the value Z.

The management component 104 translates the request from the client application 108 by referencing the entry 502 of the table 105. The request of the client application 108 is translated into a request that will be understood by the database 102. One example of the request understandable by the database 102 is a request to access the record of ACCOUNT #X and change the value of the variable INTEGER1 to the value Z. The management component 104 sends the request to the database 102 for execution.

Yet another example illustrates saving of space in the database 102 when a plurality of the client applications 108 and 110 use the database 102. The client application 108 can use the storage location 234 for a one variable at a one time, and upon release of the storage location 234 by the management component 108 after termination of the use thereof by the client application 108, the client application 110 can use the storage location 234 for another variable at another time. Such reuse of the storage location 234 allows multiple client applications with different variables to use the same version of the database 102.

For example, the client application 110 desires to store a variable in one of the available storage locations of the storage portion 222. The client application 110 sends a request to the management component 104. One example of the request is the client application 110 introducing a variable named SOCIAL SECURITY NUMBER for ACCOUNT #Y. The client application 110 needs a new storage location of the integer type to store the variable SOCIAL SECURITY NUMBER. The client application 110 sends the request to the management component 104.

The provisioning component 106 creates a selection of the storage location 234 by coordinating the data type of the variable SOCIAL SECURITY NUMBER with the corresponding capacity of the storage location 234. For example, the provisioning component 106 references ACCOUNT #Y and selects the storage location INTEGER1 to store the variable SOCIAL SECURITY NUMBER of the client application 110, where the storage location INTEGER1 is the name known to the database 102 for the storage location 234.

The management component 104 processes the request of the client application 110 based on the selection by provisioning component 106 of the storage location 234. The management component 104 records the mapping of the variable SOCIAL SECURITY NUMBER of the client application 110 into the entry 502 of the table 105. For example, the management component 104 updates the table 105 to record that for ACCOUNT #Y, the variable SOCIAL SECURITY NUMBER of the client application 110 can be found in the storage location INTEGER1. The database 102 in one example requires no update even though the client application 110 needed the storage location 234 in the database 102 to store the variable SOCIAL SECURITY NUMBER.

The steps or operations described herein are just exemplary. There may be many variations to these steps or operations without departing from the sprit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be make without departing from the sprit of the invention and these are therefore considered to be within the scope of the invention as defined in the following claims.

We claim:

1. An apparatus, comprising:
a management component that handles information storage to one or more storage locations of a database, wherein the one or more storage locations comprise one or more available locations that are free of allocation to any particular variable;
wherein upon request from a client application to associate a variable with a record of the database, the management component maps the variable to a selected location, of the one or more available locations, that is preformatted with a data type storage capacity that matches a data type of the variable;
wherein the management component maps the variable to the selected location, of the one or more available locations that are free of allocation to any particular variable, to customize variable storage capabilities of the record for specific needs of the client application,
wherein the data type of the variable comprises one of an integer type, a double type, or a string type, wherein the selected location, of the one or more available locations, is selected to have the data type storage capacity match the one of the integer type, the double type, or the string type of the variable; and wherein the management component maps the variable to the selected location, of the one or more available locations, that is preformatted with the data type storage capacity that matches the one of the integer type, the double type, or the string type of the variable.

2. The apparatus of claim 1, wherein the management component, upon introduction of the variable to the management component by the client application, maps the variable to the selected location.

3. The apparatus of claim 1, wherein the management component, upon request from the client application to cancel the variable, causes the selected location to comprise an available location, of the one or more available locations, freed from allocation to the variable.

4. The apparatus of claim 3, wherein the variable comprises a first variable, wherein the management component upon introduction of a second variable to the management component, maps the second variable to the available location freed from allocation to the first variable.

5. The apparatus of claim 1, wherein the one or more storage locations comprise the one or more available locations and a plurality of selected locations;

wherein the management component maps a plurality of variables to the plurality of selected locations;

wherein the management component serves to associate the plurality of selected locations and the respective plurality of variables with the record to expand the record.

6. The apparatus of claim 1, wherein the one or more storage locations comprise the one or more available locations, the selected location, and one or more pre-allocated locations, wherein the one or more pre-allocated locations are reserved for one or more predetermined variables of the client application, wherein the one or more pre-allocated locations comprise a fixed assignment to the record;

wherein the management component serves to associate the selected location to the record to expand the record beyond the one or more pre-allocated locations.

7. The apparatus of claim 1, wherein the record comprises the one or more available locations and one or more pre-allocated locations, wherein the one or more pre-allocated locations are reserved for one or more predetermined variables of the client application, wherein the one or more pre-allocated locations and the one or more available locations comprise a fixed assignment to the record;

wherein the management component serves to associate the variable with the selected location from the one or more available locations that comprise the fixed assignment to the record.

8. The apparatus of claim 1, further comprising:

a provisioning component that selects the selected location from the one or more available locations based on the data type storage capacity of the selected location and the data type of the variable;

wherein the provisioning component identifies the selected location to the management component to allow the management component to map the variable to the selected location.

9. The apparatus of claim 1, wherein the management component handles information storage and access to the one or more storage locations;

wherein the management component serves to add an entry in a table for the variable to indicate that the variable is stored at the selected location of the one or more available locations that are free of allocation to any particular variable, wherein the entry comprises an address of the selected location in the database.

10. The apparatus of claim 9, wherein the selected location comprises a first selected location, wherein the variable comprises a first variable, the apparatus further comprising:

a provisioning component that employs the table to determine which one or more of the one or more available locations are open for storage of variables at a given time, wherein the provisioning component selects a second selected location, from the one or more of the one or more available locations that are open for storage of variables at the given time, to store a second variable;

wherein the provisioning component identifies the second selected location to the management component to allow the management component to map the second variable to the second selected location.

11. The apparatus of claim 9, wherein the management component employs the table to manage access to the variable by the client application or additional client applications;

wherein upon request from the from the client application or one of the additional client applications to access the variable, the management component acquires the address of the selected location from the entry in the table for the variable;

wherein the management component employs the address of the selected location to access the variable for the client application of the one of the additional client applications that made the request to access the variable.

12. The apparatus of claim 1, wherein the variable comprises a first variable, wherein the selected location comprises a first storage location, wherein the one or more available locations comprise the first storage location and a second storage location;

wherein the management component associates the first variable with the first storage location based on the data type of the first variable and the data type storage capacity of the first storage location;

wherein the management component associates a second variable with the second storage location based on a data type of the second variable and the data type storage capacity of the second storage location.

13. A method, comprising the steps of:

accommodating one or more client applications in a database that comprises a pool of available storage locations free of allocation to any particular variable;

selecting, upon request from a client application of the one or more client applications to associate a variable with a record in the database, a storage location from the pool of available storage locations that is preformatted with a data type storage capacity that matches a data type of the variable;

selecting a data type of the variable that comprises one of an integer type, a double type, or a string type, wherein the selected location, of the one or more available locations, is selected to have the data type storage capacity match the one of the integer type, the double type, or the string type of the variable;

mapping with management component maps the variable to the selected location, of the one or more available locations, that is preformatted with the data type storage capacity that matches the one of the integer type, the double type, or the string type of the variable; and and storing the variable in the storage location to customize variable storage capabilities of the record for specific needs of the client application.

14. The method of claim 13, further comprising the step of:
accommodating access by the client application to the variable through matching of the variable to the storage location in the database that is free of allocation to any particular variable.

15. An article, comprising:
a computer-readable storage medium;
means in the medium for accommodating one or more client applications in a database that comprises a pool of available storage locations free of allocation to any particular variable;
means in the medium for selecting, upon request from a client application of the one or more client applications to associate a variable with a record in the database, a storage location from the pool of available storage locations that is preformatted with a data type storage capacity that matches a data type of the variable;
that comprises one of an integer type, a double type, or a string type, wherein the selected location, of the one or more available locations, is selected to have the data type storage capacity match the one of the integer type, the double type, or the string type of the variable; and
and means in the medium for storing the variable in the storage location to customize variable storage capabilities of the record for specific needs of the client application that maps the variable to the selected location, of the one or more available locations, that is preformatted with the data type storage capacity that matches the one of the integer type, the double type, or the string type of the variable.

16. The article of claim 15, further comprising:
means in the medium for accommodating access by the client application to the variable through matching of the variable to the storage location in the database that is free of allocation to any particular variable.

17. The apparatus of claim 1, wherein the one or more storage locations comprise a pool of available fields of the database free of allocation to any particular variable or any particular record, wherein the selected location comprises a field, from the pool of available fields, that is preformatted with the data type storage capacity that matches the data type of the variable;
wherein upon the request from the client application to associate the variable with the record, the management component stores the variable in the field and associates the field with the record.

18. The apparatus of claim 17, wherein prior to the management component association of the field with the record, the record is free from association with any variables or any fields;
wherein upon request from the client application, the management component serves to associate a plurality of fields, from the pool of the available fields, with the record to customize the variable storage capabilities of the record for the specific needs of the client application.

19. The apparatus of claim 17, in combination with the database, wherein the pool of available fields comprises structured data fields of a fixed data type storage capacity;
the apparatus further comprising a provisioning component that determines the data type of the variable and locates the field that is preformatted with the data type storage capacity that matches the data type of the variable;
wherein the provisioning component sends an identification of the field to the management component, wherein the management component stores the variable in the field.

20. The method of claim 13, wherein the one or more storage locations comprise a pool of structured data fields of a fixed data type storage capacity that are free of allocation to any particular variable or any particular record, wherein the record initially is free from association with any variables or any fields;
the method further comprising the step of:
associating a plurality of structured data fields, from the pool of the structured data fields, with the record to customize the variable storage capabilities of the record for the specific needs of the client application upon request from the client application.

21. The apparatus of claim 1, wherein the management component stores the variable at the selected location, wherein the selected location is free of association with the record before the request from the client application;
wherein the management component associates the selected location with the record to customize the variable storage capabilities of the record for the specific needs of the client application.

22. The apparatus of claim 1, wherein the data type of the variable comprises one of an integer type, a double type, or a string type;
wherein the one or more available locations that are free of allocation to any particular variable comprise:
one or more first available locations that are preformatted with an integer type storage capacity;
one or more second available locations that are preformatted with a double type storage capacity; and
one or more third available location that are preformatted with a string type storage capacity;
wherein the selected location comprises one of the one or more first available locations if the variable comprises the integer type, wherein the selected location comprises one of the one or more second available locations if the variable comprises the double type, wherein the selected location comprises one of the one or more third available location if the variable comprises the string type.

* * * * *